United States Patent [19]

Franklin

[11] Patent Number: 4,728,924
[45] Date of Patent: Mar. 1, 1988

[54] PORTABLE WATER DETECTOR FOR FUEL TANKS

[75] Inventor: Stanley E. Franklin, Reno, Nev.

[73] Assignee: Nelson Industries, Inc., Stoughton, Wis.

[21] Appl. No.: 858,955

[22] Filed: May 2, 1986

[51] Int. Cl.<sup>4</sup> ............................................. G08B 21/00
[52] U.S. Cl. ...................................... 340/59; 340/603
[58] Field of Search ................. 340/59, 620, 603, 604; 324/65 P; 33/126.5; 73/304 R

[56] References Cited

U.S. PATENT DOCUMENTS

| | | | |
|---|---|---|---|
| 3,582,930 | 6/1971 | Wiley | 340/620 X |
| 3,670,319 | 6/1972 | Ohtani | 340/59 X |
| 3,909,948 | 10/1975 | Markfelt | 340/620 X |
| 4,410,885 | 10/1983 | Stenstrom | 340/604 |
| 4,638,291 | 1/1987 | Pascasu | 340/59 |

OTHER PUBLICATIONS

Scully Facts, Scully WB100G Water Detector, Scully Signal Systems, 60578, Scully Signal Company, 70 Industrial Way, Wilmington, Mass. 01887.
Scully Facts, Scully Water Detector, Scully Signal Systems, 60577, Scully Signal Company, 70 Industrial Way, Wilmington, Mass. 01887.

Primary Examiner—James L. Rowland
Assistant Examiner—Brian R. Tumm
Attorney, Agent, or Firm—Andrus, Sceales, Starke & Sawall

[57] ABSTRACT

A hollow tubular cartridge (4) is tethered on an insulated electrical lead (10) connected to a hand held box (18) containing sensing circuitry. The cartridge (4) is lowered into a fuel tank (12) for sensing water in the tank (18) by a reduced electrical resistance path between probe electrodes (6 and 8) on the cartridge (4) which is sensed by circuitry within the box (18).

8 Claims, 5 Drawing Figures

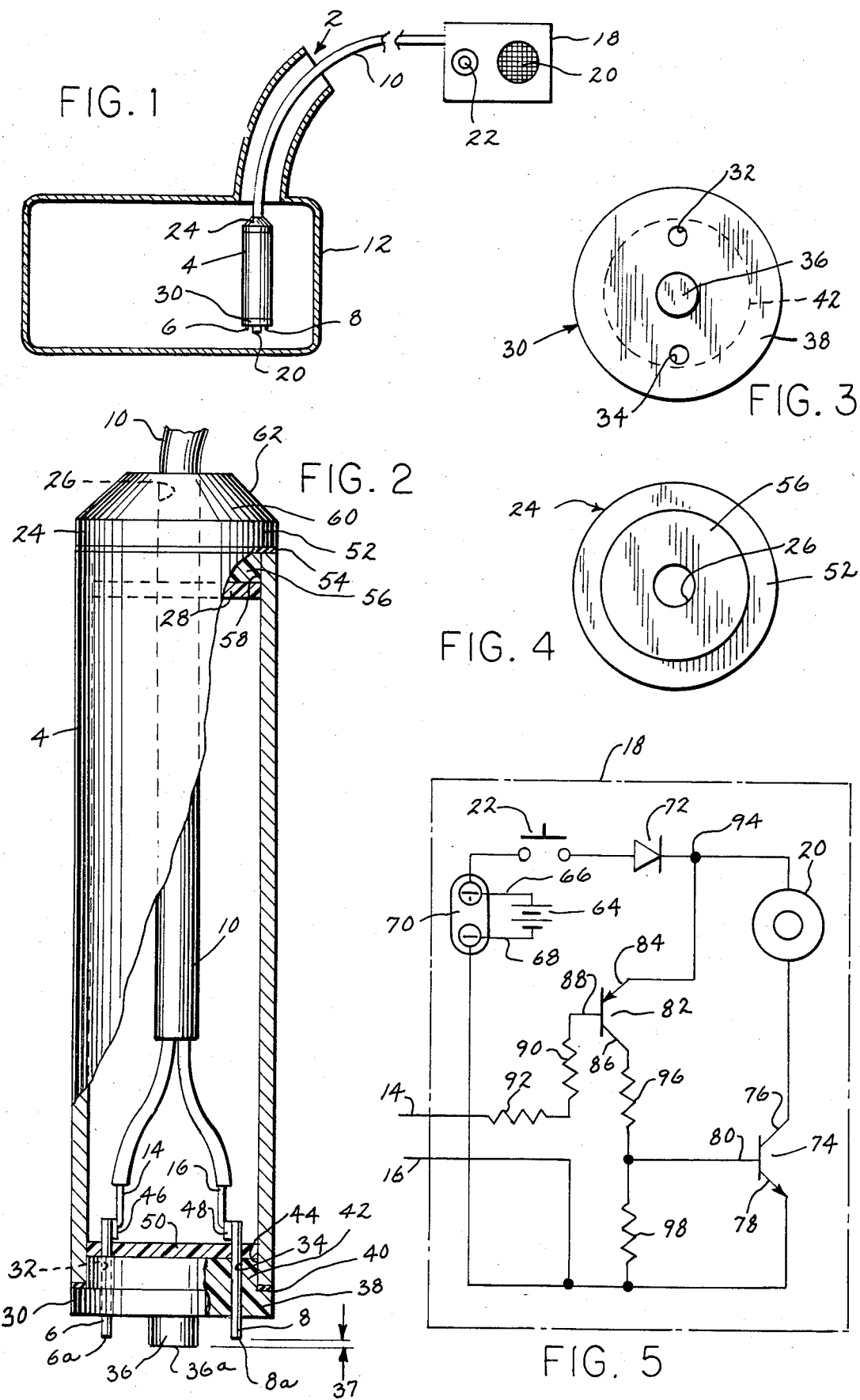

PORTABLE WATER DETECTOR FOR FUEL TANKS

BACKGROUND AND SUMMARY

The invention provides a portable device for detecting water or other foreign fluids in fuel tanks, particularly water in diesel fuel.

The invention provides a simple tethered tubular cartridge lowered into the fuel tank and having a pair of probe electrodes sensing a lower resistance current path through water present in the diesel fuel, and associated alarm circuitry. A top cap covers and seals the top end of the cartridge and secures an insulated electrical lead extending therethrough, and is configured for easy retrieval. A bottom cap covers and seals the bottom end of the cartridge and mounts and locates the probe electrodes, and includes a projection element preventing electrical shorting of the probe electrodes through a wall of the fuel tank.

BRIEF DESCRIPTION OF THE DRAWINGS

FIG. 1 illustrates the invention in use.

FIG. 2 is a side elevation view partially cut away of the tubular cartridge of the portable water detector in accordance with the invention.

FIG. 3 is a bottom view of the bottom cap of FIG. 2.

FIG. 4 is a bottom view of the top cap of FIG. 2.

FIG. 5 is a circuit diagram of the detection circuitry in accordance with the invention.

DETAILED DESCRIPTION

FIG. 1 shows a portable water detector generally designated at 2. A tubular cartridge 4 has a pair of probe electrodes 6 and 8. An insulated electrical lead 10 serves as a tether line connected to cartridge 4 for lowering the cartridge into a fuel tank 12, and for upwardly withdrawing and retrieving the cartridge from the fuel tank. Tether line 10 includes a pair of electrically conductive wires 14 and 16, FIG. 2, connected to respective probe electrodes 6 and 8. A portable hand-held box 18, FIGS. 1 and 5, is at the opposite end of tether line 10 from cartridge 4 and contains sensing circuitry connected to the wires in the tether line for sensing reduced electrical resistance between probe electrodes 6 and 8, for example the lower resistive path through water as compared with diesel fuel. Box 18 includes an audio and/or visual alarm 20 to provide an indication of water in the fuel, and a user operated manual ON/OFF switch 22.

Referring to FIGS. 2–4, cartridge 4 is an elongated hollow brass tube or cylinder. A top cap 24, of molded PVC, covers the top end of tubular cartridge 4 and is secured and sealed thereto by epoxy. Insulated electrical lead 10 extends through a central aperture 26 in cap 24 and is secured thereto by epoxy along the interface of drilled hole 26 and by epoxy shown at 28 along the underside of cap 24. Lead 10 includes electrically conductive copper wires 14 and 16 extending downwardly within cartridge 4 to the bottom thereof. A bottom cap 30, of molded PVC, covers the bottom end of tubular cartridge 4 and is secured and sealed thereto by epoxy. Electrodes 6 and 8 extend downwardly through drilled holes 32 and 34 in bottom cap 30 and have lower tips 6a and 8a for immersion and contact with the fuel in fuel tank 12 when cartridge 4 is lowered into the tank. When there is water in the tank, such water provides a lower electrical resistance path between electrodes 6 and 8 than through diesel fuel. Sensing circuitry, to be described, is provided for sensing the differential electrical resistance. Bottom cap 30 includes an integrally molded extension or projection finger 36 extending downwardly from the bottom side of cap 30 and having a lower tip 36a slightly extended beyond and lower than the lowermost extent of electrode tips 6a and 8a, as shown at dimension 37, to prevent short-circuiting electrical engagement of the electrode tips with a wall of the fuel tank. Such short-circuiting electrical path through a fuel tank wall between the probe electrode tips would give a false indication.

Bottom cap 30 includes a first disc-like portion 38 external to tubular cartridge 4 and having a diameter substantially the same as the outer diameter of cartridge 4 and sealed by epoxy to the bottom end of the cartridge along a horizontal annular surface 40. Bottom cap 30 includes a second disc-like portion 42 on top of first disc-like portion 38 and within tubular cartridge 4 and having a diameter substantially the same as the inner diameter of cartridge 4 and sealed by epoxy to the cartridge along the vertical cylindrical inner wall surface 44 of the cartridge. Probe electrodes 6 and 8 extend through each of the first and second disc-like portions throuch the noted drilled holes 32 and 34. The probe electrodes are brass and are connected to copper wires 14 and 16 by soldering at 46 and 48. Probe electrodes 6 and 8 are sealed and secured to bottom cap 30 by epoxy at 50 on the top side of the cap. Electrodes 6 and 8 may also be retained by friction fit in respective holes 32 and 34 and/or staking of same. The combined vertical thickness of disc-like portions 38 and 42 provides sufficient stock to retain probe electrodes 6 and 8 and to locate such electrodes to prevent engagement with cartridge 4 and to provide proper external spacing and extension of the electrodes.

Top cap 24 has a first disc-like portion 52 external to tubular cartridge 4 and having a diameter substantially the same as the outer diameter of the cartridge and sealed by epoxy to the top end of the cartridge along a horizontal annular surface 54. Top cap 24 has a second disc-like portion 56 within cartridge 4 of a diameter substantially the same as the inner diameter of the cartridge and sealed by epoxy to the cartridge along the vertical cylindrical inner wall surface 58 of the cartridge. Top cap 24 has an upper portion 60 on top of disc-like portion 52. The upper portion has an outer frustoconical surface 62 whose taper minimizes interference with tank protrusions during upward withdrawal and retrieval of the cartridge from the tank. Insulated electrical lead 10 extends through central hole 26 drilled vertically through portions 60, 52 and 56, and is secured by epoxy as noted above, to seal and secure lead 10 to top cap 24 and for use as a tether for lowering the cartridge into the tank and for retrieving the cartridge from the tank. It is preferred that the tether stress not be transmitted to solder connections 46 and 48.

FIG. 5 shows the sensing circuitry in box 18. Probe electrodes 6 and 8 are connected by electrical wires 14 and 16 through lead 10 to the circuitry in box 18, which is preferably spaced a convenient working distance from cartridge 4 by an appropriate length of lead 10. A battery 64 has positive and negative terminals 66 and 68 connected to a battery connector 70. The above noted user operated manual ON/OFF switch 22 and a diode 72 are connected in series with the battery. Alarm 20 is a piezoelectric transducer sound source connected in series with switch 22 and the battery. A first transistor 74 has a pair of main terminals 76 and 78 connected in series with switch 22, piezoelectric transducer 20 and battery 64. Transistor 74 has a control terminal 80 for controlling current conduction between main terminals 76 and 78. A second transistor 82 has a pair of main terminals 84 and 86 connected in series through switch 22 between positive battery terminal 66 and control terminal 80. Transistor 82 has a control terminal 88 connected through resistors 90 and 92 to wire 14 and probe electrode 6 and controls current conduction between main terminals 84 and 86. The other probe electrode 8 is connected by wire 16 to the negative battery terminal 68. A decrease in electrical resistance between probe electrodes 6 and 8 through water in the tank biases control terminal 88 from the negative terminal of the battery and hence biases transistor 82 into conduction to conduct current from the battery to control terminal 80 to bias transistor 74 into conduction to conduct current through piezoelectric transducer 20 and sound an alarm as an indication of water in the tank.

As seen in FIG. 5, ON/OFF switch 22 is connected in series with diode 72 between positive battery terminal 66 and piezoelectric transducer 20. Transistor 82 is a bipolar PNP transistor having its collector 84 connected to a node 94 between ON/OFF switch 22 and piezoelectric transducer 20. Transistor 82 has its base 88 connected to probe electrode 6 via wire 14. Transistor 82 has its emitter 86 connected through resistor 96 to control terminal 80 of transistor 74 and also connected through resistor 98 to negative battery terminal 68. Transistor 74 is a bipolar NPN transistor having its emitter 76 connected to piezoelectric transducer 20. Transistor 74 has its base 80 connected to emitter 86 of transistor 82. Transistor 74 has its collector 78 connected to negative battery terminal 68.

In operation, the user lowers tubular cartridge 4 into diesel fuel tank 12, and closes switch 22. If the resistance between probe electrodes 6 and 8 drops sufficiently, the collector-base junction of transistor 82 becomes sufficiently forward biased to drive transistor 82 into conduction. Conduction of transistor 82 conducts current from positive battery terminal 66 through closed switch 22 through diode 72 through the collector and emitter of transistor 82 through resistor 96 to the base 80 of transistor 74, driving the latter into conduction. Conduction of transistor 74 conducts current from the battery positive terminal 66 through closed switch 22 through diode 72 through piezoelectric transducer 20 through the emitter and collector of transistor 74 and returned to the negative battery terminal 68, thus activating the alarm from piezoelectric transducer sound source 20.

It is recognized that various equivalents, alternatives and modifications are possible within the scope of the appended claims.

I claim:

1. A portable water detector for fuel tanks comprising:
    an elongated hollow tubular cartridge having top and bottom ends;
    a top cap covering said top end of said cartridge and secured and sealed thereto;
    an insulated electrical lead extending through said top cap and including a pair of electrically conductive wires extending downwardly within said cartridge to said bottom end;
    a bottom cap covering said bottom end of said cartridge and secured and sealed thereto;
    a pair of electrodes extending downwardly through said bottom cap and having lower tips for immersion in fuel in said tank when said cartridge is lowered into said tank;
    sensing means for sensing reduced electrical resistance between said electrode lower tips through water in the fuel; and
    extension means on said bottom cap extending downwardly beyond said electrode lower tips to prevent short-circuiting of said tips through a wall of said fuel tank.

2. The invention according to claim 1 wherein said electrical lead is sealingly secured to said top cap and is used as a tether for lowering said cartridge into said tank and for upwardly withdrawing and retrieving said cartridge from said tank, and wherein said top cap has an outer frustoconical surface to minimize interference with tank protrusions during said retrieval of said cartridge from said tank.

3. The invention according to claim 2 wherein said top cap comprises:
    a first disc-like portion external to said cartridge and having a diameter substantially the same as the outer diameter of said cartridge and sealed to said top end of said cartridge along a horizontal annular surface;
    a second disc-like portion on the bottom of said first disc-like portion and within said cartridge and having a diameter substantially the same as the inner diameter of said cartridge and sealed to said cartridge along the vertical cylindrical inner wall surface of said cartridge; and
    a third upper external portion on top of said first disc-like portion and having said outer frustoconial surface,
    said first, second and third portions of said top cap having a vertical hole extending colinearly therethrough through which said electrical lead extends.

4. The invention according to claim 1 wherein said bottom cap comprises molded electrically insulating material including an integral projection finger centrally between said electrodes and providing said extension means.

5. The invention according to claim 1 wherein said bottom cap comprises:
    a first disc-like portion external to said cartridge and having a diameter substantially the same as the outer diameter of said cartridge and sealed to said bottom end of said cartridge along a horizontal annular surface;
    a second disc-like portion on top of said first disc-like portion and within said cartridge and having a diameter substantially the same as the inner diameter of said cartridge and sealed to said cartridge along the vertical cylindrical inner wall surface of said cartridge, said electrodes extending through each of said first and second disc-like portions, the combined vertical thickness of said disc-like portions providing sufficient stock to retain said electrodes and to locate said electrodes and prevent engagement of said electrodes with said cartridge; and
    a lower projection finger extending and wherein said extension means comprises integrally vertically from said first disc-like portion centrally between said electrodes and downwardly beyond said electrode lower tips.

6. A portable water detector for fuel tanks comprising:
an elongated hollow tubular cartridge having top and bottom ends;
a top cap covering said top end of said cartridge and secured and sealed thereto;
an insulated electrical lead extending through said top cap and including a pair of electrically conductive wires extending downwardly within said cartridge to said bottom end;
a bottom cap covering said bottom end of said cartridge and secured and sealed thereto;
a pair of probe electrodes extending downwardly through said bottom cap and having lower tips for immersion in fuel in said tank when said cartridge is lowered into said tank;
a portable box at the end of said electrical lead opposite said cartridge;
a battery in said box having positive and negative terminals;
a user operated manual ON/OFF switch in said box connected in series with said battery;
an alarm in said box connected in series with said ON/OFF switch and said battery;
a first transistor in said box having a pair of main terminals connected in series with said ON/OFF switch, said alarm and said battery, and having a control terminal for controlling current conduction between said main terminals;
a second transistor in said box having a pair of main terminals connected in series between one of said battery terminals and said control terminal of said first transistor, and having a control terminal connected through one of said conductive wires through said insulated electrical lead to one of said probe electrodes and controlling current conduction between said main terminals of said second transistor;
the other of said probe electrodes being connected through the other of said conductive wires through said insulated electrical lead to the other of said battery terminals,
such that a decrease in electrical resistance between said probe electrodes through water in said tank biases said control terminal of said second transistor from said battery to bias said second transistor into conduction to conduct current between said battery and said control terminal of said first transistor to bias said first transistor into conduction to conduct current through said alarm.

7. The invention according to claim 6 wherein:
said alarm comprises a piezoelectric transducer sound source;
said ON/OFF switch is connected in series between said positive battery terminal and said piezoelectric transducer;
said second transistor comorises a bipolar PNP transistor having a collector connected to a node between said ON/OFF switch and said piezoelectric transducer, having a base connected to said one probe electrode and having an emitter connected to said control terminal of said first transistor and also connected through a resistor to said negative battery terminal;
said first transistor comprises a bipolar NPN transistor having an emitter connected to said piezoelectric transducer, having a base connected to said emitter of said second transistor, and having a collector connected to said negative battery terminal;
said other probe electrode is connected to said negative battery terminal.

8. A portable water detector for fuel tanks comprising:
an elongated hollow tubular cartridge having top and bottom ends;
a top cap covering said top end of said cartridge and secured and sealed thereto, said top cap comprising a first disc like portion external to said cartridge and having a diameter substantially the same as the outer diameter of said cartridge and sealed to said top end of said cartridge along a horizontal annular surface, said top cap comprising a second disc like portion on the bottom of said first disc like portion and within said cartridge and having a diameter substantially the same as the inner diameter of said cartridge and sealed to said cartridge along the vertical cylindrical inner wall surface of said cartridge, said top cap comprising a third upper portion on top of said first disc like portion external to said cartridge and having an outer frustoconical surface, said first, second and third portions of said top cap having a vertical collinear hole extending centrally therethrough;
an insulated electrical lead extending through said top cap and including a pair of electrically conductive wires extending downwardly within said cartridge to said bottom end, wherein said electrical lead is sealingly secured to said top cap and is used as a tether for lowering said cartridge into said tank and for upwardly withdrawing and retrieving said cartridge from said tank, said outer frustoconical surface of said third portion of said top cap minimizing interference with tank protrusions during upward withdrawal and retrieval of said cartridge from said tank;
a bottom cap covering said bottom end of said cartridge and secured and sealed thereto, said bottom cap having a first disc like portion external to said cartridge and having a diameter substantially the same as the outer diameter of said cartridge and sealed to said bottom end of said cartridge along a horizontal annular surface, said bottom cap having a second disc like portion on top of said first disc like portion and within said cartridge and having a diameter substantially the same as the inner diameter of said cartridge and sealed to said cartridge along the vertical cylindrical inner wall surface of said cartridge, said bottom cap having a third portion extending downwardly as a lower projection finger from said first disc like portion, said first and second disc like portions of said bottom cap having a pair of holes extending therethrough;
a pair of probe electrodes extending through respective said holes in said first and second disc like portions of said bottom cap and having lower tips for immersion in fuel in said tank when said cartridge is lowered into said tank, said third portion lower projection finger of said bottom cap extending downwardly beyond said probe electrode lower tips to prevent short circuiting between said tips through a wall of said fuel tank;
a portable hand held box at the end of said insulated electrical lead opposite said cartridge;
a battery in said box having positive and negative terminals;

a user operated manual ON/OFF switch connected in series with said battery;

an alarm connected in series with said ON/OFF switch and said battery;

solid state switch means in said box having main terminal means connected in series with said alarm and having control terminal means connected to said probe electrodes for controlling conduction of said solid state switch means in response to a path of reduced electrical resistance between said probe electrodes through water in said fuel tank.

* * * * *

UNITED STATES PATENT AND TRADEMARK OFFICE
CERTIFICATE OF CORRECTION

PATENT NO. : 4,728,924
DATED : March 1, 1988
INVENTOR(S) : STANLEY E. FRANKLIN

It is certified that error appears in the above-identified patent and that said Letters Patent is hereby corrected as shown below:

Col. 4, Line 64, Claim 5, before "a lower" insert --and wherein said extension means comprises--;

Col. 5, Line 58, Claim 7, after "transistor" delete "comorises"; Col. 5, Line 58, Claim 7, after "transistor" insert -- comprises--.

Signed and Sealed this

Seventh Day of May, 1991

Attest:

HARRY F. MANBECK, JR.

Attesting Officer

Commissioner of Patents and Trademarks